(12) United States Patent
Hosseini et al.

(10) Patent No.: US 10,553,322 B2
(45) Date of Patent: Feb. 4, 2020

(54) MODULAR FLUID FLOW DISTRIBUTION SYSTEM IN WHICH DIFFERENTLY SHAPED PLATES CAN BE REARRANGED TO DIFFERENT POSITIONS

(71) Applicant: GE-HITACHI NUCLEAR ENERGY AMERICAS LLC, Wilmington, NC (US)

(72) Inventors: Mitra Hosseini, Wilmington, NC (US); Gerald A. Deaver, Wilmington, NC (US); Jesus G. Diaz-Quiroz, Wilmington, NC (US); Randy M. Brown, Wilmington, NC (US)

(73) Assignee: GE-HITACHI NUCLEAR ENERGY AMERICAS LLC, Wilmington, NC (US)

( * ) Notice: Subject to any disclaimer, the term of this patent is extended or adjusted under 35 U.S.C. 154(b) by 1062 days.

(21) Appl. No.: 14/867,936

(22) Filed: Sep. 28, 2015

(65) Prior Publication Data
US 2017/0092382 A1     Mar. 30, 2017

(51) Int. Cl.
*G21C 15/02* (2006.01)
*F28F 9/02* (2006.01)

(52) U.S. Cl.
CPC ............ *G21C 15/02* (2013.01); *F28F 9/0278* (2013.01)

(58) Field of Classification Search
CPC ........ G21C 15/02; G21C 15/18; G21C 19/28; F28B 9/02; F28F 9/0217; F28F 9/0243; F28F 9/0265; F28F 9/0278

(Continued)

(56) References Cited

U.S. PATENT DOCUMENTS 2,224,664 A * 12/1940 Bierend ................. F01D 5/041
                                                    416/185
4,660,587 A *  4/1987 Rizzie ...................... F15D 1/02
                                                      137/8
(Continued)

FOREIGN PATENT DOCUMENTS

| CA | 2918396 A1 | 1/2015 |
|---|---|---|
| EP | 2428965 A1 | 3/2012 |
| JP | H10221477 A | 8/1998 |

OTHER PUBLICATIONS

International Search Report and Written Opinion issued in connection with corresponding PCT Application No. PCT/US2016/054091 dated Nov. 30, 2016.

*Primary Examiner* — Jack W Keith
*Assistant Examiner* — Daniel Wasil
(74) *Attorney, Agent, or Firm* — Ryan Alley IP

(57) ABSTRACT

Modular flow control systems include several differently-shaped structures to achieve desired flow characteristics in fluid flow. Systems include one or many plates held in desired positions by a retainer within the flow. The plates are uniquely shaped based on their position, or vice versa, to shape flow in a desired manner. The plates may fill an entire flow area or may extend partially throughout the area. Plates can take on any shape and are useable in systems installed in any type of flow conduit. When used in a PCCS upper manifold in a nuclear reactor, a chevron plate directly below the inlet divides flow along the entire upper manifold. Perforated plates allow flow to pass at ends of the PCCS upper manifold. The plates can be installed along a grooved edge during an access period and held in static position by filling the length of the PCCS upper manifold.

9 Claims, 4 Drawing Sheets

(58) Field of Classification Search
USPC ...... 376/202, 352, 298, 299; 138/37, 39, 41;
137/8, 574, 808; 165/158, 161,
165/DIG. 409; 251/127; 55/416;
210/155, 214, 253, 294, 299, 318, 330,
210/341, 345, 447, 492, 521, 624, 641
See application file for complete search history.

(56) References Cited

U.S. PATENT DOCUMENTS

| | | | | |
|---|---|---|---|---|
| 4,815,534 | A * | 3/1989 | Fuerschbach | F28F 13/12 |
| | | | | 165/166 |
| 8,715,500 | B2 | 5/2014 | Graham | |
| 8,794,301 | B2 | 8/2014 | Lundorf | |
| 2004/0007272 | A1 * | 1/2004 | Gershtein | B65D 90/52 |
| | | | | 137/574 |
| 2006/0236718 | A1 | 10/2006 | Lundberg | |
| 2011/0108258 | A1 * | 5/2011 | Magnier-Cathenod | |
| | | | | F28F 3/046 |
| | | | | 165/167 |
| 2011/0174407 | A1 * | 7/2011 | Lundberg | B01F 5/0618 |
| | | | | 138/37 |
| 2012/0131891 | A1 | 5/2012 | Nishiura et al. | |
| 2013/0175013 | A1 | 7/2013 | Yoshioka et al. | |
| 2014/0033760 | A1 * | 2/2014 | Garner | F25B 37/00 |
| | | | | 62/476 |
| 2015/0146839 | A1 | 5/2015 | Marquino et al. | |
| 2015/0310944 | A1 * | 10/2015 | Alpay | G21C 15/16 |
| | | | | 376/371 |

* cited by examiner

MODULAR FLUID FLOW DISTRIBUTION SYSTEM IN WHICH DIFFERENTLY SHAPED PLATES CAN BE REARRANGED TO DIFFERENT POSITIONS

BACKGROUND

FIG. 1 is a cross-section of a related art Passive Containment Cooling System (PCCS) 10, such as a PCCS 10 useable in an ESBWR or other type of nuclear power plant. For example, PCCS 10 may be submerged in a coolant source like a PCCS pool inside or near a nuclear reactor containment building. As shown in FIG. 1, PCCS 10 may include an inlet 15 that receives steam, heated water, non-combustible gasses, and/or other energetic fluids that may accumulate in a nuclear reactor containment or other power production environment. For example, inlet 15 may include an opening into a nuclear power plant containment that receives such fluids and delivers the fluids to related art PCCS 10. Inlet 15 flows into an upper manifold 11, which may be a large, voided drum or other fluid-receiving structure. One or more end plates 19 may be bolted to upper manifold 11 to close ends of upper manifold 11 for fluid containment.

Upper manifold 11, in turn, connects to several vertical PCCS tubes 12 below upper manifold 11. Fluid may be distributed in manifold 11 and flow into PCCS tubes 12, under gravity and/or energy from inlet 15. Because PCCS tubes 12 may be submerged in a coolant, like chilled water, the increased surface area of PCCS tubes 12 may cool and/or condense fluid received into PCCS 10. Such cooling and condensation in PCCS tubes 12 may further drive the fluid downward into lower manifold 13. Condensed liquid collecting down into lower manifold 13 may flow out through an outlet 14 of PCCS 10. Additional details of related art PCCS structures are described in co-owned US Patent Publication 2015/0146839 to Marquino et al., the entirety of which is incorporated herein by reference in its entirety.

SUMMARY

Example embodiments include systems to control fluid flow in a flow path of an open or closed volume. Example systems use several swappable plates that can be positioned at desired sequences or intervals in the flow. The plates have varying surfaces that interact with and/or direct the flow in desired ways. A retainer holds the various plates in position, achieving the desired flow. For example, plates may mate with a retaining edge extending a length of the flow volume, and plates may be a width of the flow volume, such that when the length of the retaining edge is filled with the plates, the entire flow area may be filled. Plates can present a variety of geometries, including perforations, labyrinthine passages, chevrons, voids, mixing tabs, swirl vanes, and solid, flat planes to enhance, impede, make turbulent, mix, direct, and/or change fluid flow. Plates can be placed in positions in the volume based on their geometries and effect on flow to achieve desired flows. For example, a chevron plate may be placed directly below an inlet for a high-velocity and high-temperature steam and non-condensable gas mixture in a PCCS upper manifold, and the chevron plate may deflect and redirect the flow to diffuse it along an entire length of the upper manifold.

Example methods include installing modular fluid flow control systems in areas subject to fluid flow. Different plates can be placed at different positions within the volume to achieve desired flow. For example, a plate with a chevron and a plate with several perforations may be slid into a retaining edge that allows single-dimensional movement of the plates until the volume is full. The retainer to hold the plates may be separately installed in the volume or may already be present. In example methods plates may be swapped, removed, or added because they are modular, in order to achieve desired flow characteristics.

BRIEF DESCRIPTIONS OF THE DRAWINGS

Example embodiments will become more apparent by describing, in detail, the attached drawings, wherein like elements are represented by like reference numerals, which are given by way of illustration only and thus do not limit the terms which they depict.

DETAILED DESCRIPTION

Figure 1:
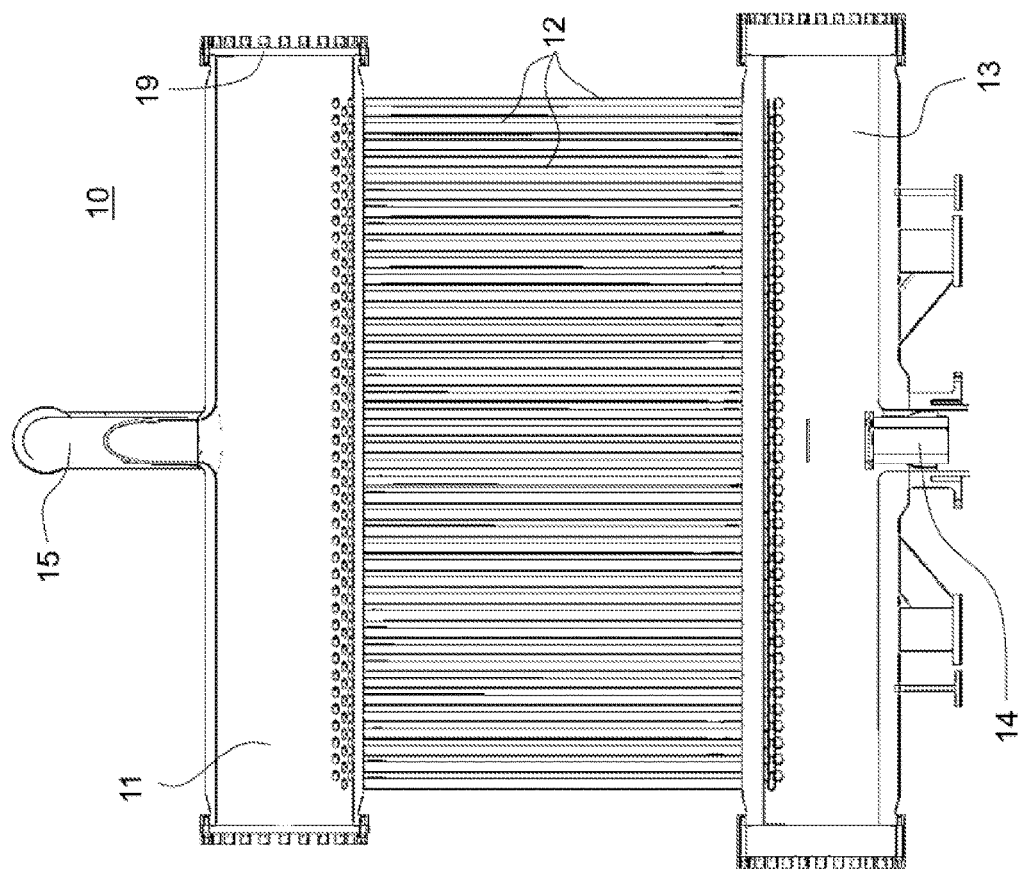
FIG. 1 is an illustration of a related art passive containment cooling system (PCCS).

Because this is a patent document, general broad rules of construction should be applied when reading and understanding it. Everything described and shown in this document is an example of subject matter falling within the scope of the appended claims. Any specific structural and functional details disclosed herein are merely for purposes of describing how to make and use example embodiments or methods. Several different embodiments not specifically disclosed herein fall within the claim scope; as such, the claims may be embodied in many alternate forms and should not be construed as limited to only example embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected," "coupled," "mated," "attached," or "fixed" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.). Similarly, a term such as "communicatively connected" includes all variations of information exchange routes between two devices, including intermediary devices, networks, etc., connected wirelessly or not.

As used herein, the singular forms "a", "an" and "the" are intended to include both the singular and plural forms, unless the language explicitly indicates otherwise with words like "only," "single," and/or "one." It will be further understood that the terms "comprises", "comprising,", "includes" and/or "including", when used herein, specify the presence of stated features, steps, operations, elements, ideas, and/or components, but do not themselves preclude the presence or addition of one or more other features, steps, operations, elements, components, ideas, and/or groups thereof.

It should also be noted that the structures and operations discussed below may occur out of the order described and/or noted in the figures. For example, two operations and/or figures shown in succession may in fact be executed concurrently or may sometimes be executed in the reverse order, depending upon the functionality/acts involved. Similarly, individual operations within example methods described below may be executed repetitively, individually or sequentially, so as to provide looping or other series of operations aside from the single operations described below. It should be presumed that any embodiment having features and functionality described below, in any workable combination, falls within the scope of example embodiments.

The Inventors have newly recognized that highly energetic fluids, such as saturated steam, combustibles, and super-heated non-condensable gasses, may produce uneven flow distribution in typical PCCS systems when produced in a power plant. For example, during a transient involving a loss of coolant, superheated containment, or other event with highly energetic fluid flows, such fluids may enter a PCCS system 10 (FIG. 1) though an inlet 15 (FIG. 1). Due to the energy of these fluid flows, upper manifold 11 (FIG. 1) may be unable to evenly disperse or diffuse the energetic flow across all PCCS tubes 12 (FIG. 1), thereby reducing the overall efficiency of the PCCS system 10 (FIG. 1).

The Inventors have further recognized that fluid flow generally, such as in manifolds as well as pipes, vents, drains, etc., may be difficult to easily manage based on different encountered flows. For example, it may be desirable to evenly-distribute a heated flow through a heat exchanger, or it may be desirable to limit flows around sensitive components or change internal flow characteristics for expected destructive flows. However, fluid flow structures are typically statically constructed with simple binary flow on/off controls without finer, easily-implemented control over internal flow characteristics. Example embodiments described below address these and other problems recognized by the Inventors with unique solutions enabled by example embodiments.

The present invention is systems and methods for modularly adjusting fluid flow through an area. In contrast to the present invention, the small number of example embodiments and example methods discussed below illustrate just a subset of the variety of different configurations that can be used as and/or in connection with the present invention.

Figure 2:
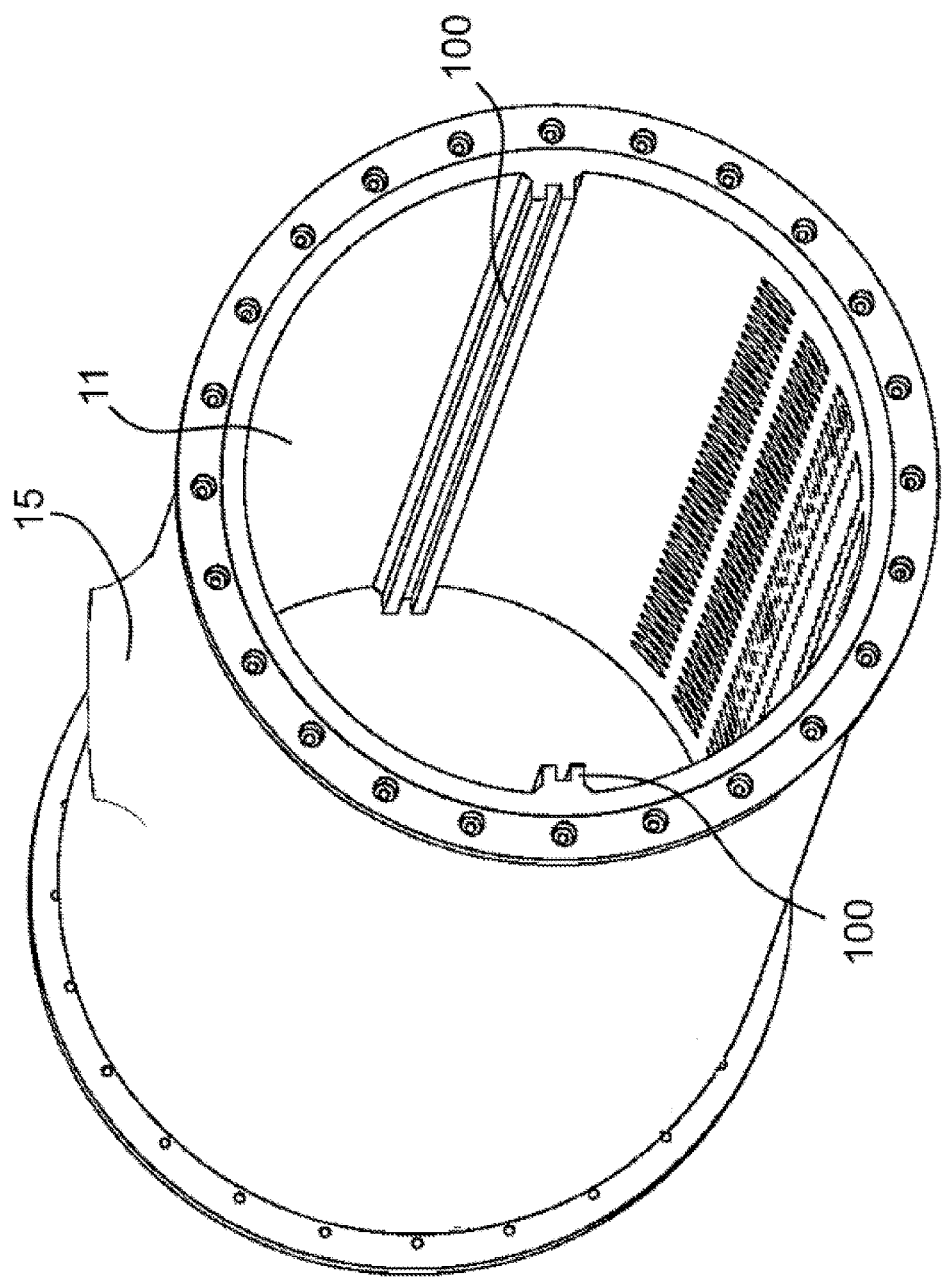
FIG. 2 is an illustration of a PCCS upper manifold modified in accordance with example methods.
Figure 3:
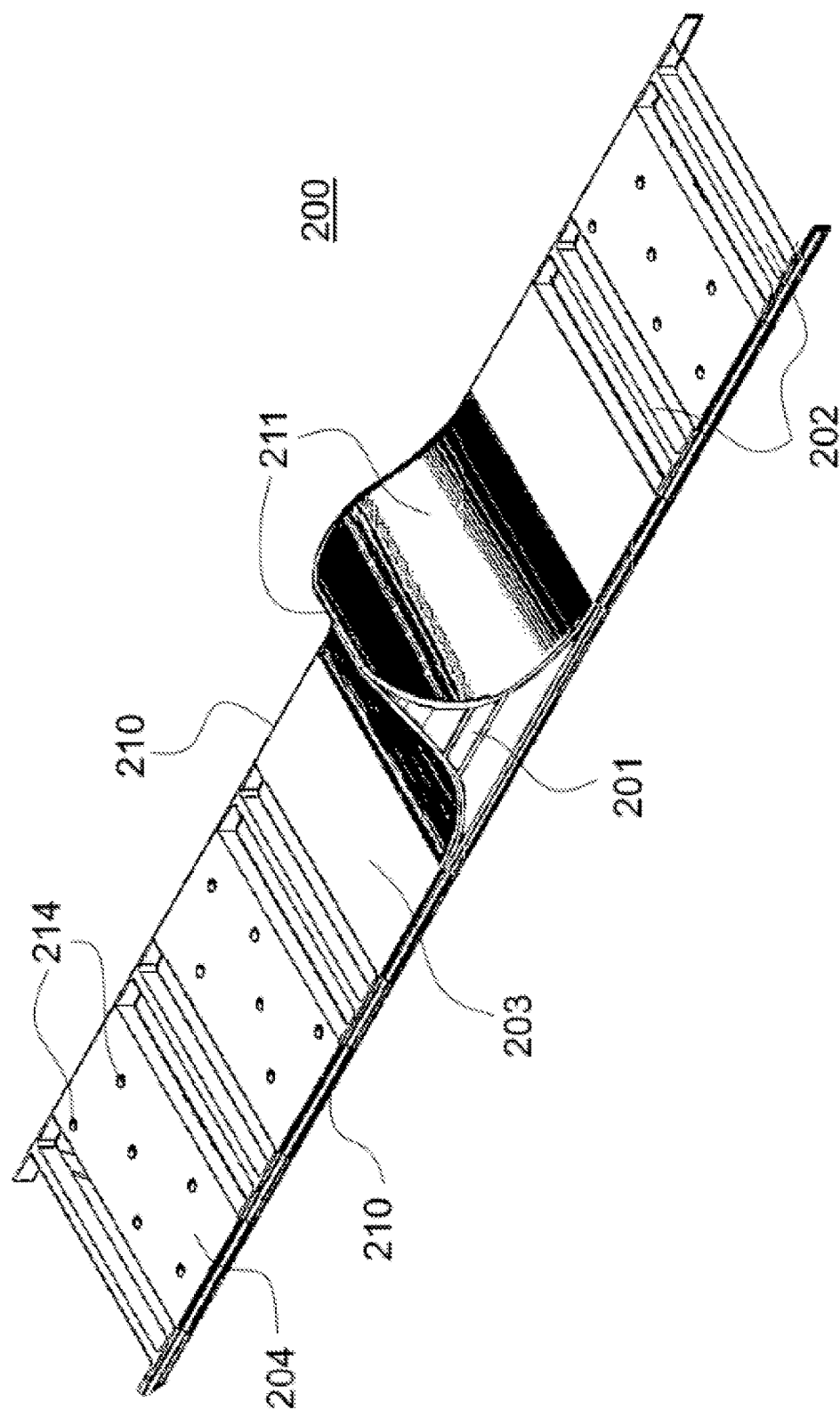
FIG. 3 is an illustration of an example embodiment modular fluid diverter system.

FIG. 2 is an illustration of a PCCS upper manifold 11 modified in accordance with an example system and method. As shown in FIG. 3, manifold 11 includes a retainer to hold an example embodiment diverter. For example, a notched or grooved ledge 100 may be affixed to or formed on an inner surface of upper manifold 11. Grooved ledge 100 may run an entire length of upper manifold 11 or may be partial or discontinuous. Multiple grooved ledges 100 may be used in example embodiments; for example, two opposite grooved ledges 100, as shown in FIG. 2, may be on opposite inner surfaces of upper manifold 11 so as to face one another with grooves opening toward one another. Grooved ledges 100 may be rigid and fabricated of materials known to maintain their physical properties in a nuclear reactor environment.

Example methods may create retaining structures like grooved ledge 100 through installation or at initial creation of upper manifold 11. For example, grooved ledges 100 may be installed by welding or bolting during a plant outage or other maintenance period when operators have access to upper manifold 11. Or, for example, grooved ledge 100 may be integrally formed during the casting and/or shaping of upper manifold 11 so as to always be present in PCCS upper manifold 11. Although shown installed in an upper manifold 11 of a PCCS system, it is understood that grooved ledge 100 used in connection with example embodiments may be installed in other fluid passages, like pipes or vents.

FIG. 3 is an illustration of an example embodiment fluid diverter system 200. As shown in FIG. 3, fluid diverter system 200 includes one or more modular plates configured to be retained in a retainer of example methods. For example, fluid diverter system 200 may include several plates all having a tongued-edge 210 that matches and mates with grooved ledge 100 (FIG. 2) on both sides of the plates. In this way, example embodiment fluid diverter system 200 may slide between and be retained by grooved ledge 100 (FIG. 2). Of course, other retaining structures may be used, including dovetails, mechanical interlocks, zippers, magnetized surfaces, locking pieces, etc., to join example embodiment system 200 with a desired flow space, such as upper manifold 11 (FIG. 2). Similarly, while example system 200 may use a sliding structure to allow single-dimensional movement of modular plates that are locked in place by adjacent plates and/or interior surfaces, it is understood that other loading structures, like grooves, ratchets, chains, springs, adhesives, tangs-and-slots, etc. may be used to selectively move and retain plates in desired positions with respect to fluid flow.

Example embodiment fluid diverter system 200 may include different types of plates to selectively manage flow where system 200 is employed. For example, example embodiment system may be installed such that largest surfaces of system 200 are perpendicular throughout a fluid flow through a volume, requiring fluid flow substantially interact with system 200. Alternately, example embodiment fluid diverter system 200 may be angled or placed at any other orientation with respect to expected fluid flow. Various plates may be installed and retained in example embodiment system 200 at expected positions and orientations of fluid flow to control the fluid flow in any desired manner.

For example, as shown in FIG. 3, example embodiment flow diverter system 200 may include a chevron plate 201 with oppositely-wedged or curved surfaces 211. Chevron plate 201 may divide and/or redirect an energetic flow encountering opposite surfaces 211 in order to redistribute or separate fluid flows. Example system 200 may similarly include a blocking plate 203, which is substantially solid and blocks relatively all flow therethrough. As fluid encounters solid plate 203 perpendicular to flow, such flow may be stopped; similarly, where solid plate 203 is encountered at an angle, such flow may become angled as well. Example system 200 may include a perforated plate 204 that includes one or more holes 214 positioned and dimensioned to allow only a desired amount or location of fluid flow through perforated plate 204. Sufficiently small holes 214 may further limit fluid flow through frictional forces as well as reduced flow area, and holes 214 may be specifically positioned, such as at an edge or in a gradient, to control and shape fluid flow through perforated plate 204. Example embodiment system 200 may also include a voided plate or separator plate 202 that minimally obstructs flows while separating or positioning adjacent plates. For example, separator plate 202 may contain 95% or more open flow area, while perforated plate 204 may have less than 95% open flow area created by holes 214.

Because plates 201, 202, 203, and 204 may all have similar widths terminating at tongued edges 210 that mate into a retainer in a flow passage, any of plates 201, 202, 203, and 204 may equally fit in a same flow passage, such as by being slid lengthwise into a same grooved edge 100 (FIG. 2). That is, plates 201, 202, 203, and 204 may be modular within example systems. As shown in FIG. 3, plates 201, 202, 203, and 204 may directly abut one another at length ends of each plate when installed. Further, plates 201, 202, 203, and/or 204 may interlock or become removably joined in the length dimension by use of magnets, adhesives, locking joints, fasteners, etc. to prevent fluid flow from significantly escaping between plates.

Plates 201, 202, 203, and/or 204 may be mixed and matched along a length of example system 200 when installed in a flow path. That is, any of plates 201, 202, 203, and 204 may be selected for a particular length position to achieve desired fluid flow at that position. As shown in FIG. 3, for example, perforated plates 204 may be positioned at length ends of example system 200, separated by separator plates 202. Depending on sizing and numerosity of holes 214 as well as widths of separator plates 202, fluid may flow relatively easily through length ends of example embodiment system 200. Chevron plate 201 and/or solid plates 203 may occupy more central locations, which may both divert and block fluid from flowing through central length portions of example embodiment flow diverter system 200. Of course, other arrangements with different numbers, orders, and individual characteristics of plate(s) are useable in example systems outside of the sequence shown in FIG. 3.

Figure 4:
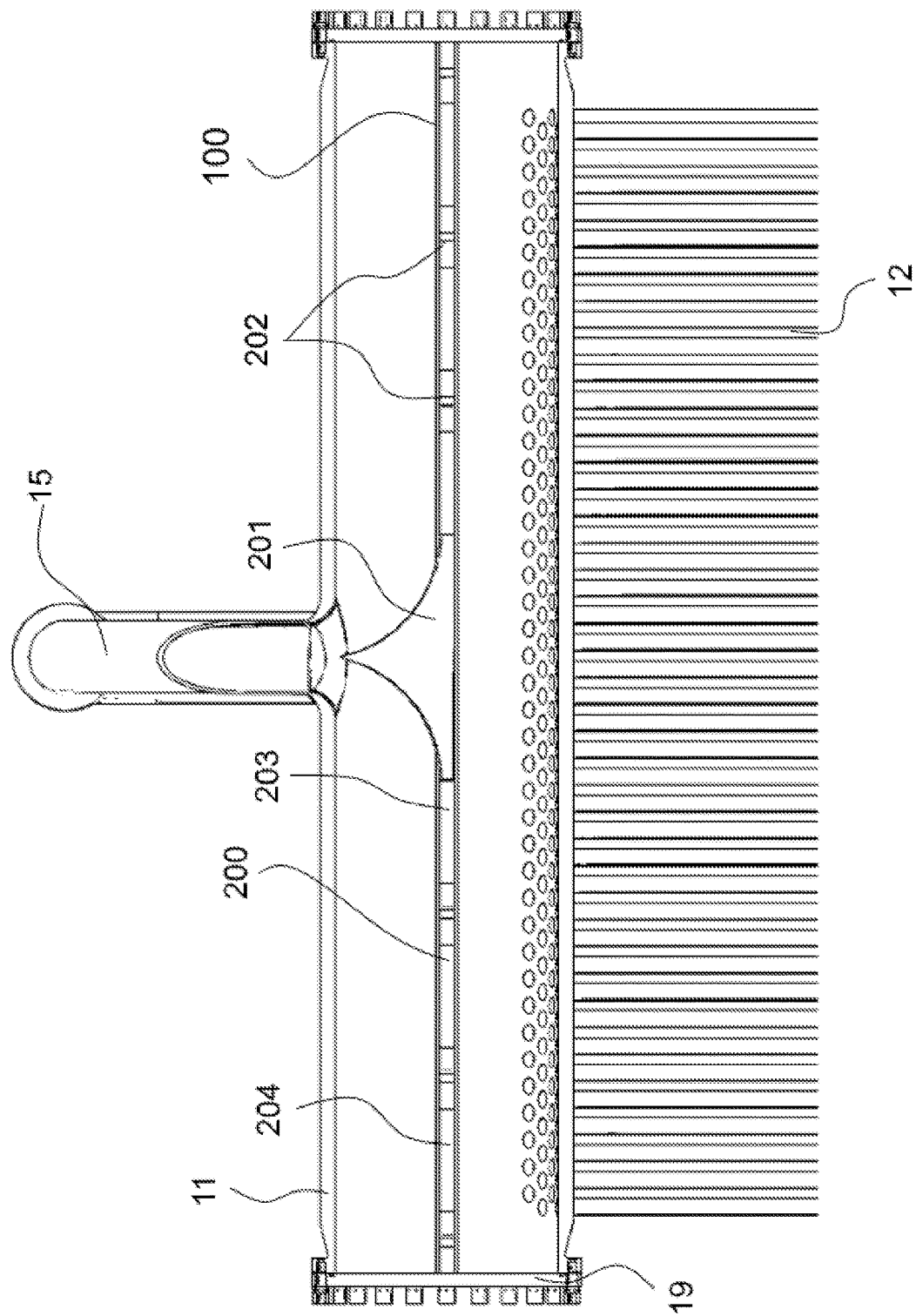
FIG. 4 is an illustration of an example embodiment modular fluid diverter system installed in a PCCS upper manifold.

FIG. 4 is an illustration of an example embodiment flow diverter system 200 as installed in an upper manifold 11 of a PCCS system. In example methods, end plates 19 of PCCS upper manifold 11 may be removed during a maintenance or outage period, allowing access to an interior of upper manifold 11. One or more plates of example system 200 may be installed in retainers in manifold 11 while end plate 19 is removed. For example, plates may be slid in grooved ledges 100 at either side of manifold 11 as shown in FIG. 2 via tongued edges 210. When a desired number and sequence of plates are installed, end plate 19 may be reaffixed to manifold 11, sealing the same.

As shown in FIG. 4, in one example embodiment, chevron plate 201 may be positioned directly below inlet 15 of a PCCS system. In this way, energetic flows of saturated steam and/or non-condensable or noncombustible gasses from inlet 15 may be diverted by chevron plate 201 along a length of example embodiment system and thus upper manifold 11. One or more blocking plates 203 directly at both sides of chevron plate 201 may further enhance the diversion and/or diffusion of the energetic flow along a length of upper manifold 11. Then perforated plates 204 and separator plates 202 may be positioned at lengthwise ends of example embodiment system 200. Perforated plates 204 and separator plates 202 may permit substantially more fluid flow into PCCS tubes 12 directly vertically below perforated plates 204 and separator plates 202. All plates in example embodiment flow diverter system 200 may directly abut in a lengthwise arrangement and occupy substantially all flow path through manifold 11. All plates may further be substantially perpendicular to incoming flow from inlet 15, requiring all fluid flow to interact with example embodiment flow diverter system 200.

The sequence of plates shown in the example of FIG. 4 significantly equalizes energetic fluid flows though all PCCS tubes 12 in a conventional PCCS system. Because chevron plate 201 and/or blocking plates 203 diverts flow away from inlet 15 lengthwise, energetic flow cannot overwhelm central PCCS tubes 12 directly below inlet 15. Further, because perforated plates 204 allow more flow at ends of upper manifold 11, PCCS tubes 12 at lengthwise ends of manifold 11 may receive larger amounts of flows, preventing backflows or circular flows though PCCS systems. Moreover, because plates in example embodiment system 200 are modular and may be relatively easily installed, removed, and/or swapped with other plates having desired flow characteristics such as chevrons, holes, or voids, levels and distributions of flows in upper manifold 11 can be fine-tuned and controlled to achieve desired flows simply by replacing or moving plates with particular characteristics to desired positions.

Example embodiments and methods thus being described, it will be appreciated by one skilled in the art that example embodiments may be varied and substituted through routine experimentation while still falling within the scope of the following claims. For example, a variety of different fluid flow structures aside from PCCS manifolds are compatible with example embodiments and methods simply through proper dimensioning of example embodiments and fall within the scope of the claims. Such variations are not to be regarded as departure from the scope of these claims.

What is claimed is:

1. A modular system for controlling an energetic fluid flow through a conduit, the system comprising:
    the conduit, wherein the conduit is an upper manifold configured to receive the energetic fluid flow in a nuclear power plant and includes an inlet providing the energetic fluid flow into the upper manifold;
    a lower manifold configured to receive a cooled and condensed fluid flow;
    a plurality of tubes providing a flow path between the upper and the lower manifolds, wherein the plurality of tubes are surrounded by a heat sink configured to convert the energetic fluid flow into the cooled and condensed fluid flow in the plurality of tubes;
    a retainer configured to rigidly join to an internal wall of the conduit; and
    a plurality of plates all configured to removably, directly join to the retainer, wherein at least two of the plurality of plates present differing flow surfaces from each other, wherein all of the plurality of plates are positionable in place of each other in the retainer, and wherein the plurality of plates include a chevron plate positioned directly vertically under the inlet and at least one of a solid flat plate, a perforated flat plate, and a spacing plate.

2. The system of claim 1, further comprising:
    an opposite retainer matching the retainer, wherein the plurality of plates all have a same width that matches a width of the conduit.

3. The system of claim 2, wherein all the plurality of plates directly touching lengthwise have a total length that matches a length of the conduit so that a flow path of the conduit is completely filled by the modular system.

4. The system of claim 1, wherein the plurality of plates includes the chevron plate directly touching a first flat solid plate at a first lengthwise end of the chevron plate and a second solid flat plate at a second lengthwise end of the chevron plate.

5. The system of claim 4, wherein the plurality of plates further includes a first spacer plate directly touching the first flat solid plate, a second spacer plate directly touching the second flat solid plate, a first perforated plate directly touching the first spacer plate, and a second perforated plate directly touching the second spacer plate.

6. The system of claim 5, wherein the chevron plate includes a surface that is only two oppositely-angled surfaces, wherein the first and the second spacer plates are substantially fully voided, and wherein the first and the second perforated plates include a plurality of holes.

7. The system of claim 1, wherein the retainer is a first grooved ledge extending a length of the conduit, the system further comprising:
 a second grooved ledge extending the length of the conduit, wherein the plurality of plates all include two opposite tongued edges that slide into the first and the second grooved ledge so as to permit movement of the plates in only a single dimension.

8. The system of claim 1, wherein the retainer includes two opposite ledges with grooves, and wherein the plurality of plates all include two opposite edges with tongues that each mate with one of the grooves so that all of the plates are slidable lengthwise in the upper manifold and otherwise static.

9. The system of claim 1, wherein the plurality of plates occupies a complete flow area of the upper manifold such that all the energetic fluid flow must pass through the plurality of plates.

* * * * *